UNITED STATES PATENT OFFICE 2,679,101

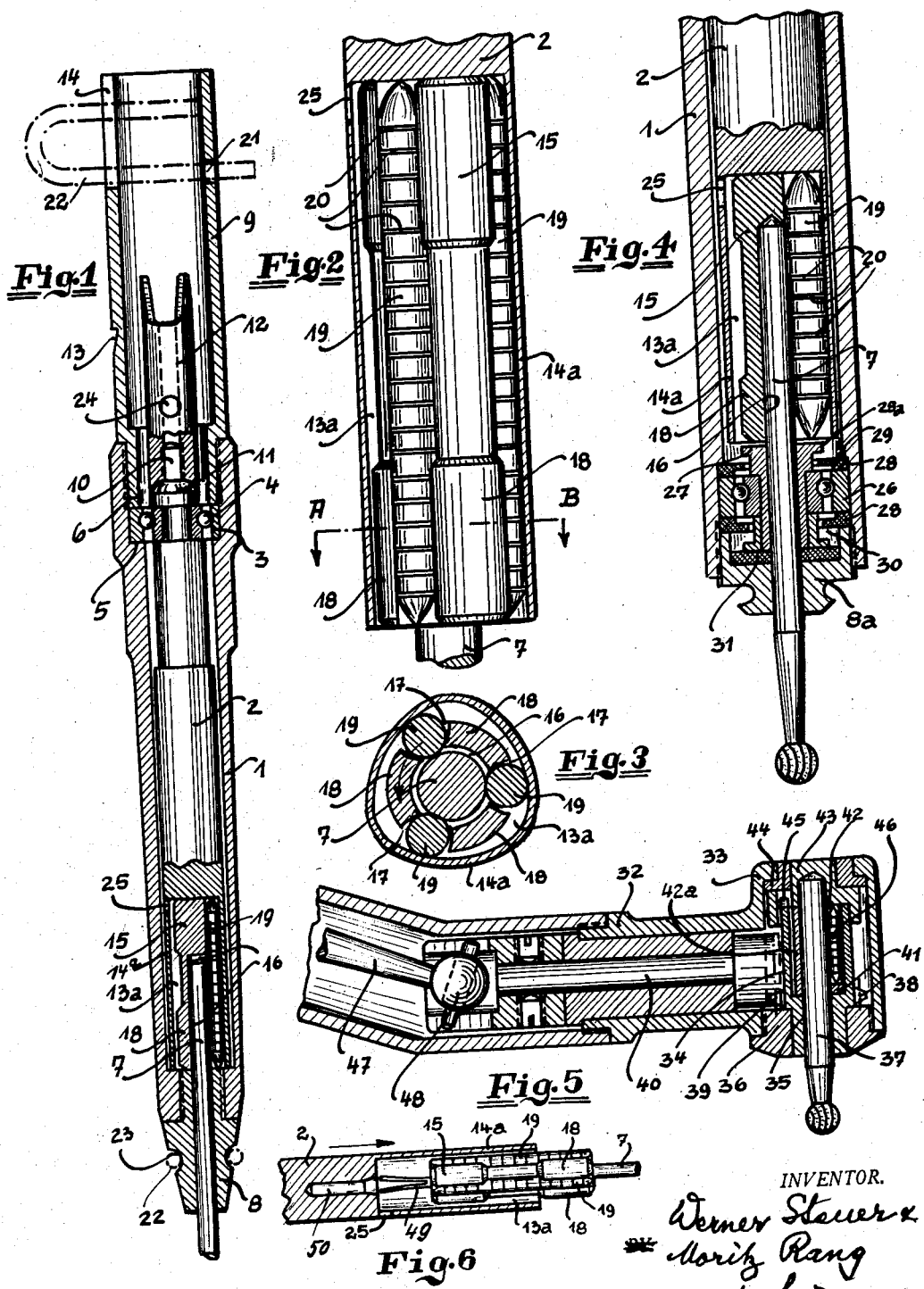

TOOL MOUNT FOR DENTAL DRILLS AND THE LIKE

Werner Steuer and Moritz Rang, Frankfurt am Main, Germany, assignors of one-third to Ulrico G. I. Klohn, Buenos Aires, Argentina Application September 2, 1949, Serial No. 113,722

Claims priority, application Germany May 11, 1949

18 Claims. (Cl. 32—27)

This invention relates to drills, and more particularly to attachments or hand-pieces wherein to insert the tools for drilling, cutting and grinding operations, especially in connection with dental drills or apparatus in dental laboratories, but usable also for a wide variety of industrial purposes.

It is an object of the invention to provide a hand-piece of such simplified construction that it may be taken apart for cleaning purposes and reassembled with far greater ease than was heretofore possible.

The invention has the further object of providing hand-pieces of the aforenoted type with a rapid-acting clamping chuck, wherein to insert and replace simply and quickly the various tools required in drilling, cutting and grinding operations, and which so secures the tools inserted in it by way of an automatic locking arrangement that in the course of the operations enumerated above, they are driven safely and under absolute control of the driving mechanism.

A particular object of the invention is to so provide the individual parts of the hand-piece that they may be readily sterilized in hot oil and, once the sterilization has been completed, the oil may easily flow off, so that there is no longer a danger of oil spraying from a freshly sterilized hand-piece.

Other objects, and the manner in which the same are attained, will become apparent as the specification proceeds.

In the drawing accompanying the specification and forming part thereof, three embodiments of the invention are shown diagrammatically by way of example.

In the drawing,

Fig. 1 is a longitudinal section of a hand-piece containing a clamping chuck;

Fig. 2 is a longitudinal section, on a larger scale, of the clamping chuck forming part of Fig. 1;

Fig. 3 is a cross-section taken along line A—B in Fig. 2;

Fig. 4 shows a modification of the hand-piece which is particularly adapted for use in connection with dental laboratory apparatus;

Fig. 5 is a longitudinal section of a second modification involving an angular hand-piece; and Fig. 6 is a longitudinal section of a modification of the clamping chuck.

Referring now to the drawing, and first to Figs. 1 to 3, the hand-piece essentially comprises a sleeve 1, which accommodates, with the necessary play, the driving shaft 2 for the drilling, cutting or polishing tools, respectively. This shaft is supported and centered in the sleeve, on the one hand, by a small ball-bearing 3, arranged on the rear end of the shaft, and abutting, with its outer ring 4, against the shoulder 5 of a recess 6 provided in the rear end of the sleeve, and, on the other hand, by the shaft 7 of the tool inserted in the clamping chuck, the shaft 7 being guided by a longitudinal bore provided in the nipple 8 which is secured to the front end of the sleeve 1. The ball-bearing 3 is further held in place by the extension piece 9 which, upon being screwed into the recess 6 which has an inner screw thread, abuts with its lower edge against the outer ring 4 of the ball-bearing so as to prevent rotation thereof. The rear end of the driving shaft 2 extends into a screw-threaded spindle 10 which, after interposition of a small conical intermediate piece 11, engages a sleeve 12 to which the driving shaft of the apparatus is connected. For purposes of securing to the hand-piece the drilling hose, the so-called "Doriot"-rods or whatever other connection with the driving shaft is used, the extension piece 9 is provided, in a known manner, with a notch 13 and a slot 14 which are engaged by the fastening means on the connecting piece of the drilling hose or the like when the latter is slid over the tube 9.

The driving shaft 2 preferably is made of one piece of such length that there is very little play between its front end and the nipple 8. The front end of the driving shaft is provided with a longitudinal bore 13a, the circular lateral wall 14a of which, in its front portion, is transformed by lateral compression, into what appears, in section, as a triangle having about equal curved sides, as seen in the illustration of the section in Fig. 3. Instead of compressing the side wall of the circular bore into one of about triangular cross-section, a triangular bore may be drilled to begin with.

The bore 13a accommodates the clamping device for the various tools to be used. This clamping device comprises a short rod 15 made of steel or the like, and provided with a longitudinal bore 16 extending over about three quarters of its length. On the surface of this rod, there are further arranged three longitudinal grooves 17 which extend over the entire length of the rod, and which cut the wall of the bore 16 in such a manner that three resilient prongs 18 are formed. Preferably, the front ends of these prongs are turned somewhat inwardly.

The space enclosed by these prongs has a diameter which corresponds to the diameter of the shaft of the tool which thus may be inserted therein to be gripped by the prongs.

Each of the longitudinal grooves 17 contains a tension roller 19 which, on the one hand, touches, in the groove, the shaft 7 of the tool inserted in the clamping device and which, on the other hand, projects somewhat beyond the circumference of the clamping device, as shown in Fig. 3. The diameter of the clamping device inclusive of the tension roller is such that when it is inserted in the bore 13a of the driving shaft 2 in such a manner that the tension rollers are located in the corners of this somewhat triangular bore, a certain lateral swivel movement of the clamping device in this bore 13a can take place. If, however, the driving shaft 2 is rotated, the tension rollers engage the lateral walls of the triangular bore 13a which are more closely adjacent to the tension rollers than are the corners, with the result that the clamping device is automatically coupled to the driving shaft and the tool inserted in the clamping device is rotated correspondingly; the pressure of the tension rollers on the shaft of the tool lightly clamps the latter and increases as the number of revolutions of the driving shaft increases so as to insure a safe mount for the tool. When the driving shaft stops rotating, the above-described coupling either disengages itself or else may be easily disengaged by a slight rotation of the tool in the opposite direction, so the tool may be removed readily from the clamping device.

In order to further improve the hold of the tension rollers on the shaft of the tool, the surface of the tension rollers may be roughened by grooves or flat threads (saw threads), as indicated at 20.

From the foregoing description it will be apparent that the insertion or exchange of the tools in the handpiece proceeds simply by sliding the shaft 7 of the tool through the bore in the nipple 8 into the clamping device 15, and between the prongs 18, to be automatically clamped therein when the apparatus is started, without there being any necessity of operating any special holder mechanism.

Manifestly, the new handpiece consists of relatively few parts, a fact which increases safety and precision of operations and facilitates taking apart and reassembly for cleaning and sterilizing purposes.

In order to make it easier to take the handpiece apart, the extension piece 9 is provided, opposite the slot 14, with a small bore 21, through which a hairpin-shaped key 22 may be inserted. By turning this key sideways, the extension piece 9 can be screwed off easily so the driving shaft 2 together with the clamping device 15 may be removed from the sleeve 1. The nipple 8 is provided with two small groove-shaped depressions 23, into which the key 22 may be slid from the side to assist in screwing off the nipple for cleaning or replacement purposes. Furthermore, the tube-shaped parts of the hand-piece are provided, near their ends, with bores 24 and 25 which permit, upon sterilization by oil, the oil to run off easily when the parts have been assembled.

Referring now to Fig. 4, this differs from the embodiment of the invention shown in Figs. 1 to 3 only in that the nipple 8a, at the front end of the sleeve 1, is shortened and that to the rear of this nipple and inside the sleeve 1, another ball-bearing 26 is arranged which serves as an additional bearing for the shaft 7 of the tool. This hand-piece is particularly suited for comparatively heavy work in the dental laboratory, and offers the advantage that the ball-bearing eliminates all friction between the shaft of the tool and the bore in the nipple.

This ball-bearing 26 is seated on a box 27 which is supported in a recess provided in the sleeve 1 by two lateral discs 28, which are freely rotatable on the box. When the nipple 8a is screwed on tightly, the lateral discs 28 firmly engage the outer ring of the ball-bearing and hold the same firmly, the rear one of the lateral discs 28 abutting against the shoulder 29 of the said recess in sleeve 1 so that when the tool rotates, the inner ring of the ball-bearing rotates in the outer ring thereof. The box 27 may be provided with small flanges 28a and between these flanges and the lateral discs 28, small labyrinths 30 are formed which are useful for collecting polishing dust etc. In order to further pack the hand-piece to prevent the intrusion of dust, the nipple 8a may be provided with a packing disc 31 made of felt or the like.

Fig. 5 shows an angular hand-piece where the tool is driven from the side. In this case, centering of the driving shaft is effected by the tool which makes necessary a certain modification of the clamping device for the tool. The adjustable angular arm 32 has a head-piece 33, in the lower locking nut 36 of which the driving shaft consisting of a sleeve 34 is journaled by means of a fulcrum pin 35 arranged at the bottom and having a center bore. The bore of this fulcrum pin 35 forms the first bearing for the shaft 37 of the tool. For its drive, the sleeve 34 mounts, on its casing, an annular gear 38 which is engaged by the herringbone gear 39 mounted on the driving shaft 40. The sleeve 34, the casing of which is laterally compressed as described with reference to Figs. 1 to 4, in a manner such that a sleeve bore having a somewhat triangular section is obtained, accommodates the clamping chuck 41 for insertion of the tool. This clamping chuck consists of a small thick-walled tube having a bore corresponding to the diameter of the shaft of the tool and having arranged, on the outside, three equally spaced longitudinal grooves 42 which do not extend over the entire length of the tube, but only to some point near the lower end thereof, and which subdivide the tube surface into three resilient prongs 42a. Each of these longitudinal grooves 42 contains a tension roller 46, the surface of which is preferably roughened.

The driving shaft 34 further mounts a cap 43 forming the second bearing for the shaft 37 of the tool, the cap 43 itself finding a bearing in the upper bearing box 44 of the headpiece 33, and being driven by a driver 45 mounted on the driving shaft during rotation thereof. When the driving shaft 34 rotates, the tension rollers, as described more in detail with reference to Figs. 1 to 3, engage the inner wall of the driving shaft 34 and together with this form a wedge-type lock clamping tightly the shaft of the tool. The insertion of the tool takes place simply by sliding the tool into the clamping chuck where it is automatically secured upon rotation, thus eliminating the special mounting mechanism required up to now. Similarly, the tools may be replaced by simply withdrawing them from the clamping chuck when the motion of the driving shaft is arrested.

The driving shaft 40 may be connected advantageously with the shaft 47 by means of a ball-type universal joint 48 which dispenses with the need for a bearing.

When rough cutters or large grinding wheels or grindstones are used, it may happen at times that the clamping chuck and the tension rollers start to vibrate with the result that the coupling between the clamping chuck and the tool shaft is temporarily disrupted. If during the time the coupling is disrupted the hand-piece performs a pulling movement, it may occur that the tool is pulled a little out of the clamping chuck.

This drawback is eliminated by the arrangement shown in Fig. 6. The rear end of the clamping chuck 15 mounts a small slotted pin 49 which is adapted to enter a corresponding bore 50 provided in the front end of the shaft 2. The interengagement of pin 49 and bore 50 provides a bearing for the rear end of the clamping chuck and eliminates any vibration thereof, while the slotting of the pin 49 serves the purpose of preventing any longitudinal displacement of the clamping chuck during operation.

We wish it to be understood that we do not desire to be limited to the exact details of construction, design and operation shown and described as numerous modifications falling within the scope of the appended claims, and involving no deviation from the spirit of the invention or any sacrifice in the advantages thereof, may occur to persons skilled in the art.

We claim:

1. A hand-piece for drilling, cutting and grinding tools, particularly adapted for dental drills and dental laboratory apparatus, comprising in combination, a driven shaft having a bore and cam-shaped wall sections surrounding said bore, a clamping chuck arranged in said bore, friction rollers in said clamping chuck adapted to firmly grip a tool shaft inserted in the clamping chuck upon rotation of said shaft and consequent engagement with said cam sections, and a tube surrounding said driven shaft having a perforated bottom closure through which to insert the tool shaft, said driven shaft and clamping chuck having free play with respect to said tube adjacent said perforated bottom closure.

2. A hand-piece according to claim 1, wherein the bore in the driven shaft, in section, has substantially the form of a triangle with equal, curved sides.

3. A hand-piece according to claim 1, wherein the clamping chuck comprises a tubular member having a plurality of grooves evenly spaced along its circumference and therebetween, a plurality of resilient prongs, the friction rollers being positioned in said grooves and adapted to engage, on the inside, a tool shaft inserted in said tubular member and, on the outside, the cam-shaped wall sections surrounding the bore in the driven shaft, whereby upon rotation of the driven shaft the friction rollers are clamped within said bore to in turn firmly engage the tool shaft and thus automatically couple tool and driving shafts.

4. A hand-piece according to claim 1, wherein the clamping chuck includes friction rollers having a roughened surface.

5. A hand-piece comprising a tubular housing, a perforated nipple closing one end thereof, a clamping device whereby to engage a tool shaft positioned within said tube, and a ball-bearing for the tool shaft arranged in said tube between said nipple and said clamping device, said clamping device having free radial play and being unsupported adjacent said nipple.

6. A hand-piece for drilling, cutting, and grinding tools comprising in combination, a driven shaft having a central bore and cam-shaped wall sections surrounding said bore, a clamping chuck positioned in said bore and including friction rollers adapted to firmly grip a tool shaft inserted therein upon rotation of said shaft and a consequent wedging of said rollers with said cam sections, a tubular housing member enclosing said driven shaft, means extending angularly through one side of said tubular housing and including structure for driving said driven shaft, a bearing cap positioned within said housing and being rotatably mounted therein for supporting one end of the tool shaft, said bearing cap being connected for rotation with said driven shaft, and a bearing box enclosing one end of said tubular housing and mounting said bearing cap for rotation therein.

7. A hand-piece according to claim 6, comprising a head-piece for the angular member, a perforated locking-nut on said head-piece, and a fulcrum pin mounted in said locking-nut and mounting the driven shaft, the bore of the driven shaft extending through the fulcrum pin, so as to form a bearing for the tool shaft in the fulcrum pin.

8. A hand-piece according to claim 6, comprising a gear mounted on the circumference of the driven shaft whereby to engage the driving shaft.

9. A hand-piece according to claim 6, said driving means comprising two driving shaft sections positioned at an angle relative to one another, and a ball-type universal joint connecting said sections.

10. A hand-piece according to claim 1, comprising a recess in said driven shaft and a slotted pin on said clamping chuck adapted for mutual yielding interengagement, whereby to prevent longitudinal displacement and vibration of the clamping chuck.

11. A hand-piece according to claim 1, wherein all tubular parts are equipped with apertures at their lowest portions, whereby to permit the draining off of a sterilization fluid.

12. A hand-piece according to claim 1, comprising means on at least one of the members consisting of the driving shaft and the clamping chuck for forming a yielding interengagement therebetween, whereby to prevent longitudinal displacement and vibration of the clamping chuck.

13. A hand-piece according to claim 1, wherein the bottom closure of the tube surrounding the driven shaft comprises a perforated nipple.

14. A coupling connection for power driven dental drills including a solid power shaft having one end terminating in a thin walled hollow sleeve, said sleeve forming a triangularly shaped hollow sleeve cam of uniform cross-sectional dimension, a clamping chuck positioned within said hollow cam and having a plurality of axially extending radially spaced finger members, friction rollers positioned in said clamping chuck between said spaced finger members, said finger members supporting said rollers in radially spaced position about a central axis defining an opening for admission of a drill tool into said chuck whereby to force said rollers into frictional engagement with said triangular shaped sleeve cam.

15. The combination set forth in claim 14 in which said clamping chuck is formed as a cylindrical plug having a diameter smaller than the diameter of said sleeve cam and said fingers freely extend axially from the periphery of said plug adjacent one cylindrical end thereof.

16. The combination set forth in claim 15 in which said plug portion of said chuck abuts the solid portion of said power shaft.

17. A hand-piece for supporting the tool shaft of a drill comprising in combination, a tubular housing having an enlarged closed end portion, a power shaft mounted in said housing and extending into said enlarged portion, a hollow bore in said enlarged portion extending at an angle to said housing, a tool supporting bearing cap positioned in said bore and rotatably seated at one end thereof in said enlarged portion, said cap including a tool shaft supporting seat, a closure cap positioned in said enlarged portion and enclosing the other end of said bore, said closure cap including a central bearing surface, a tubular drive sleeve positioned in said bearing surface and including radially spaced resilient fingers extending into engagement with said tool supporting bearing, driving means connecting said power shaft and said sleeve, and a tool shaft clamping structure positioned within said sleeve.

18. A clamping chuck structure for a dentist drill comprising, a tubular drive sleeve including a reduced section forming tool-shaft supporting central bearing at one end thereof, a rotatable bearing cap positioned coaxially with said sleeve and including radially spaced resilient fingers extending towards said central bearing in said sleeve and a tool shaft supporting seat aligned with said central sleeve bearing, friction rollers positioned between said radially spaced fingers, and a lost motion connection between said sleeve and said rotatable bearing.

References Cited in the file of this patent

UNITED STATES PATENTS

| Number | Name | Date |
|---|---|---|
| 147,959 | Morrison | Feb. 24, 1874 |
| 1,427,286 | Graves | Aug. 29, 1922 |
| 1,458,293 | Hinchey | June 12, 1923 |
| 1,638,175 | Terry | Aug. 9, 1927 |
| 1,688,410 | Chayes et al. | Oct. 23, 1928 |
| 2,251,057 | Iseman | July 29, 1941 |

FOREIGN PATENTS

| Number | Country | Date |
|---|---|---|
| 871,222 | France | Jan. 10, 1942 |